(12) United States Patent
Kang et al.

(10) Patent No.: US 11,909,213 B1
(45) Date of Patent: Feb. 20, 2024

(54) ENERGY STORAGE SYSTEM AND METHOD OF OPERATION THEREOF

(71) Applicant: EN Technologies Inc., Gyeonggi-do (KR)

(72) Inventors: Hyun Jae Kang, Seoul (KR); Seung Sig Nam, Gyeonggi-do (KR); Tay Seek Lee, Gyeonggi-do (KR); Seong Ho Yun, Seoul (KR); Hee Se Hong, Gyeonggi-do (KR)

(73) Assignee: EN TECHNOLOGIES INC., Gyeonggi-Do (KR)

( * ) Notice: Subject to any disclaimer, the term of this patent is extended or adjusted under 35 U.S.C. 154(b) by 0 days.

(21) Appl. No.: 18/243,265

(22) Filed: Sep. 7, 2023

(30) Foreign Application Priority Data

Sep. 7, 2022 (KR) .................. 10-2022-0113416

(51) Int. Cl.
  *H02J 3/32* (2006.01)
  *H02J 3/38* (2006.01)
  *H02J 3/00* (2006.01)

(52) U.S. Cl.
  CPC ............... *H02J 3/32* (2013.01); *H02J 3/003* (2020.01); *H02J 3/381* (2013.01); *H02J 2203/10* (2020.01); *H02J 2203/20* (2020.01); *H02J 2300/20* (2020.01)

(58) Field of Classification Search
  CPC ...... H02J 3/32; H02J 3/00; H02J 3/003; H02J 3/38; H02J 3/381; H02J 2203/20; H02J 2203/10; H02J 2300/20
  See application file for complete search history.

(56) References Cited

FOREIGN PATENT DOCUMENTS

| JP | 2019-213364 A | 12/2019 |
|---|---|---|
| KR | 10-2015-0078479 A | 7/2015 |
| KR | 10-2019-0024368 A | 3/2019 |
| KR | 10-1971906 B1 | 4/2019 |
| KR | 10-2022-0080551 A | 6/2022 |

OTHER PUBLICATIONS

Office action dated Nov. 24, 2022 from Korean Patent Office in a counterpart Korean Patent Application No. 10-2022-0113416 (all the cited references are listed in this IDS.) (English translation is also submitted herewith.).

Notice of Allowance dated Mar. 20, 2023 from Korean Patent Office in a counterpart Korean Patent Application No. 10-2022-0113416 (all the cited references are listed in this IDS.) (English translation is also submitted herewith.).

*Primary Examiner* — Robert L Deberadinis
(74) *Attorney, Agent, or Firm* — PL Law Group, PLLC (57) ABSTRACT

An energy storage system includes an energy storage device that stores energy generated from a new and renewable energy power plant, a power management device that monitors an amount of power of the new and renewable energy power plant, determines an operation mode of the energy storage device based on a result of monitoring a reference capacity of a line connected to the new and renewable energy plant and the amount of power, and controls a power capacity flowing through the line according to the operation mode, and a power conversion device that receives a command corresponding to the operation mode from the power management device and controls an operation of the energy storage device according to the command.

13 Claims, 10 Drawing Sheets

ENERGY STORAGE SYSTEM AND METHOD OF OPERATION THEREOF

CROSS-REFERENCE TO RELATED APPLICATION

This application claims the benefit under 35 USC § 119(a) of Korean Patent Application No. 10-2022-0113416 filed on Sep. 7, 2022, in the Korean Intellectual Property Office, the entire disclosure of which is incorporated herein by reference for all purposes.

BACKGROUND

1. Field

The present disclosure relates to an energy storage system.

2. Description of Related Art

An electrical power system refers to a system in which a power plant, a substation, a transmission and distribution line, and a load are integrated to generate and use power. The power plant produces electricity and transmits the electricity to a transmission-end substation. The transmission-end substation transmits electricity to a distribution-end substation. The distribution-end substation divides and distributes electricity to final consumers.

Meanwhile, there is a lot of interest in new and renewable energy with which electricity can be generated without carbon dioxide emission, and the expansion of new and renewable energy plants is inevitable. As the new and renewable energy power plants are expanded, a technology capable of stably supplying power while efficiently using existing facilities is required.

SUMMARY

It is intended to contribute to the stabilization of the electrical power system through the energy storage system without the expansion of a line even if new and renewable energy power plants are expanded.

Even if the new and renewable energy power plants are expanded, the line can be operated without the expansion of a line by adjusting the load of the line using the energy storage system.

It is intended to improve a utilization rate of the line by controlling a charging operation or a discharging operation of the energy storage system.

It is intended to achieve the goal of reducing carbon dioxide by expanding new and renewable energy power plants in existing facilities.

According to an aspect of the present disclosure, there is provided an energy storage system including an energy storage device that stores energy generated from a new and renewable energy power plant, a power management device that monitors an amount of power of the new and renewable energy power plant, determines an operation mode of the energy storage device based on a result of monitoring a reference capacity of a line connected to the new and renewable energy plant and the amount of power, and controls a power capacity flowing through the line according to the operation mode, and a power conversion device that receives a command corresponding to the operation mode from the power management device and controls an operation of the energy storage device according to the command, in which the power management device obtains history information on the amount of power produced by the new and renewable energy power plant, predicts an amount of power corresponding to a condition, which is based on a storage capacity of the energy storage device and the reference capacity of the line, of a new and renewable energy power plant to be newly installed using the condition and the history information, and generates modeling information including information about a type of the new renewable energy power plant to be newly installed and an operational schedule corresponding to the type, based on the predicted amount of power.

According to another aspect of the present disclosure, there is provided a method of operation of an energy storage system including monitoring an amount of power of a new and renewable energy power plant, determining an operation mode of an energy storage device based on a result of monitoring a reference capacity of a line connected to the new and renewable energy plant and the amount of power, and controlling a power capacity flowing through the line according to the operation mode, in which the method of operation of the energy storage system further includes obtaining history information on the amount of power produced by the new and renewable energy power plant, predicting an amount of power corresponding to a condition, which is based on a storage capacity of the energy storage device and the reference capacity of the line, of a new and renewable energy power plant to be newly installed using the condition and the history information, and generating modeling information including information about a type of the new renewable energy power plant to be newly installed and an operational schedule corresponding to the type, based on the predicted amount of power.

According to still another aspect of the present disclosure, there is provided a power system including a new and renewable energy power plant, a line connected to the new and renewable energy power plant and supplying generated power to an electrical power system, and an energy storage system that is connected to the line and monitors an amount of power of the new and renewable energy power plant, determines an operation mode of an energy storage device based on a result of monitoring a reference capacity of the line and the amount of power, and controls a power capacity flowing through the line according to the operation mode, in which the energy storage system obtains history information on the amount of power produced by the new and renewable energy power plant, predicts an amount of power corresponding to a condition, which is based on a storage capacity of the energy storage device and the reference capacity of the line, of a new and renewable energy power plant to be newly installed using the condition and the history information, and generates modeling information including information about a type of the new renewable energy power plant to be newly installed and an operational schedule corresponding to the type, based on the predicted amount of power.

BRIEF DESCRIPTION OF THE DRAWINGS

The present disclosure may be readily understood in combination with the detailed description that follows and the accompanying drawings, wherein reference numerals denote structural elements.

DETAILED DESCRIPTION

Hereinafter, various embodiments will be described in detail with reference to the drawings. Embodiments described below may be modified and implemented in various different forms. In order to more clearly describe the characteristics of the embodiments, a detailed description of matters widely known to those skilled in the art to which the following embodiments belong will be omitted.

Meanwhile, in this specification, when a configuration is said to be "connected" to another configuration, this includes not only the case of being 'directly connected', but also the case of being 'connected with another configuration in between'. In addition, when a configuration is said to "include" another configuration this means that it may further include other configurations rather than excluding other configurations unless otherwise specified.

In addition, terms including ordinal numbers such as 'first' or 'second' used in this specification may be used to describe various components, but the components should not be limited by the terms. These terms are only used for the purpose of distinguishing one component from another component.

Throughout the specification, "new and renewable energy" means a combination of new energy and renewable energy. "New energy" refers to energy that is used by converting existing fossil fuels or that uses electricity or heat through chemical reactions such as hydrogen and oxygen. For example, types of new energy may include hydrogen energy, fuel cells, liquefied coal gas, etc. "Renewable energy" means energy used by converting renewable energy including sunlight, water, geothermal heat, precipitation, biological organisms, etc. For example, types of renewable energy may include sunlight, solar heat, wind power, hydropower, ocean energy, geothermal heat, bioenergy, waste energy, etc.

Throughout the specification, the "new and renewable energy power plant" means a place that generates electricity by converting new and renewable energy into electrical energy.

Throughout the specification, the "energy storage system" refers to a system that stores excess power and uses it when the power is insufficient or delivers the power where needed. The energy storage system may charge a part of power supplied from a power plant and discharge charged power when the power is insufficient.

Throughout the specification, "line" refers to a path that is connected to the new and renewable energy power plant and the energy storage system and supplies power received from the new and renewable energy plant or energy storage system to a load. A "reference capacity" of the line means an amount of power that can be transmitted through the line. The reference capacity may be a maximum transmission capacity or a preset transmission capacity.

Figure 1:
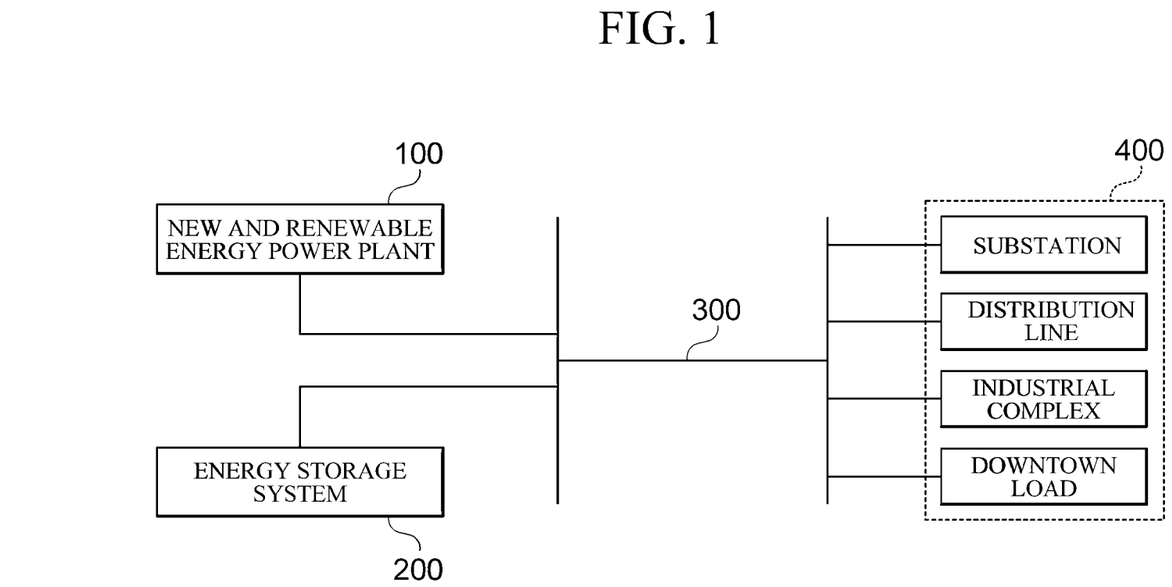
FIG. 1 illustrates a power system that controls a power capacity of a line for supplying power generated by a new and renewable energy power plant to an electrical power system according to an embodiment.

FIG. 1 illustrates a power system that controls power capacity of a line 300 for supplying power generated by a new and renewable energy power plant 100 to an electrical power system according to an embodiment.

Referring to FIG. 1, the power system may be configured with the new and renewable energy power plant 100, an energy storage system 200, the line 300, and a load 400. For example, the load 400 may be a substation, a distribution line, an industrial complex, a downtown load, etc.

For example, the new and renewable energy power plant 100 may be a solar power plant, a wind power plant, a tidal power plant, a wave power plant, a fuel cell power plant, a bio power plant, etc., and is not limited to the above examples.

The energy storage system 200 may charge a part of power generated by the new and renewable energy power plant 100 in the energy storage device 250, and discharge power stored in the energy storage device 250 according to a state of the line 300 or the load 400. For example, it is assumed that the line 300 can transmit power as much as a reference capacity. When the power generated by the new and renewable energy power plant 100 exceeds the reference capacity, a storage space for storing the excess power or an additional line for accommodating the excess power is required. The energy storage system 200 may store excess power and supply power when needed even without installing additional lines.

For example, when the power produced by the new and renewable energy plant 100 exceeds the reference capacity of the line 300, the energy storage system 200 may charge power produced by the renewable energy power plant 100 as much as the power exceeding the reference capacity of the line 300. By charging the energy storage system 200 with the excess power, the capacity of the line 300 may be maintained as much as the reference capacity.

For example, if the power produced by the new and renewable energy power plant 100 does not exceed the reference capacity of the line 300, the line 300 may additionally accommodate power other than the power produced by the new and renewable energy power plant 100. In this case, the energy storage system 200 may discharge a part of the charged power to the line 300. The energy storage system 200 may control the operation of the energy storage system 200 so that a power capacity flowing through the line 300 is as large as the reference capacity.

Figure 2:
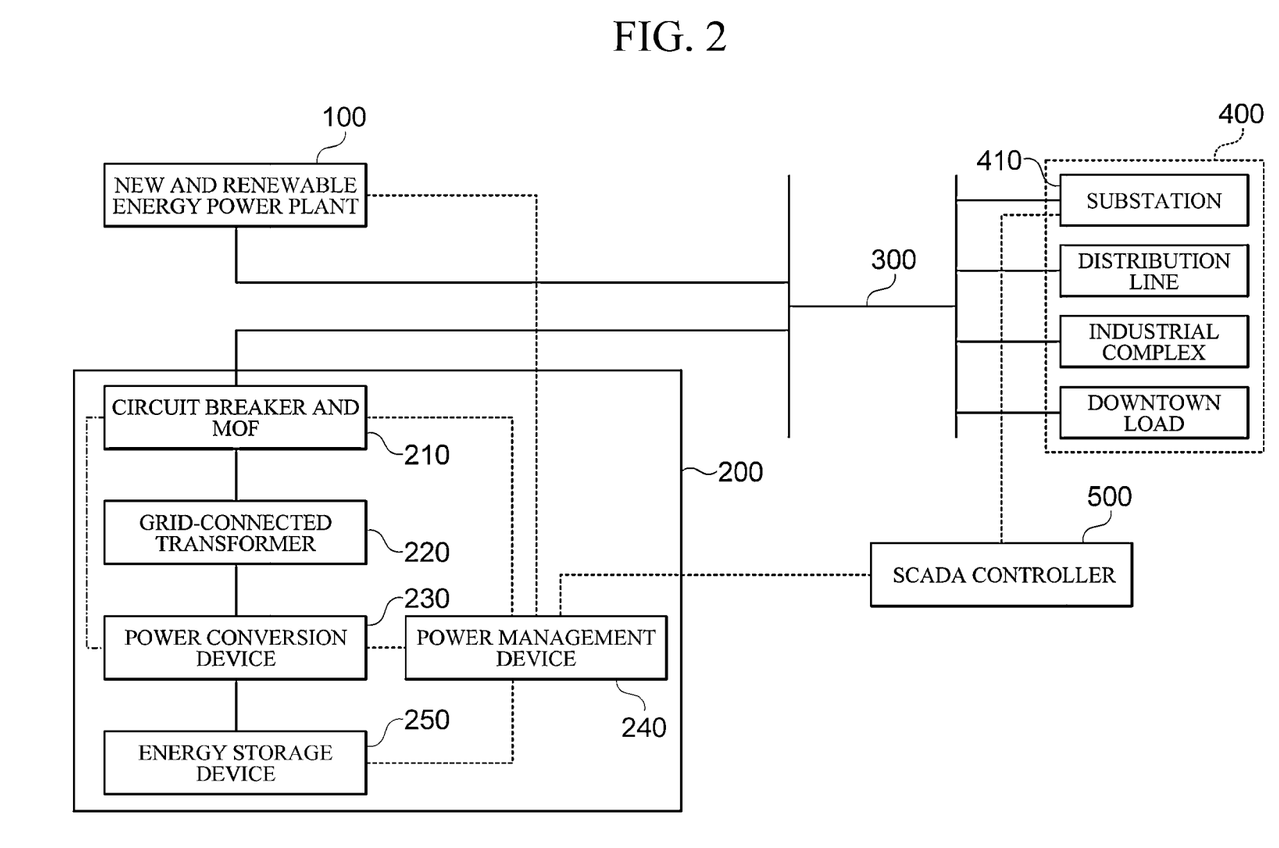
FIG. 2 is a block diagram illustrating a configuration of an energy storage system according to an embodiment.

FIG. 2 is a block diagram illustrating a configuration of the energy storage system 200 according to an embodiment.

Referring to FIG. 2, the energy storage system 200 may include a circuit breaker and MOF 210, a grid-connected transformer 220, a power conversion device 230, an energy storage device 250, and a power management device 240. However, not all illustrated components are essential components. The energy storage system 200 may be implemented with more components than those illustrated, and the energy storage system 200 may be implemented with fewer components. Hereinafter, the above components will be described. The energy storage system 200 illustrated in FIG. 2 may correspond identically to the energy storage system 200 illustrated in FIG. 1.

The circuit breaker and MOF 210 may monitor whether abnormal voltage, abnormal current, abnormal frequency, or abnormal temperature are detected on the energy storage system 200 in order to protect the energy storage system 200, and stop the operation of the energy storage system 200 when an abnormality occurs.

The grid-connected transformer 220 may adjust the magnitude of voltage in order to supply power to the electrical power system side. Since power loss occurs due to resistance of the line 300, the grid-connected transformer 220 may supply power by increasing the magnitude of voltage.

The energy storage device 250 may store energy generated by the new and renewable energy power plant 100. For example, the energy storage device 250 may include a battery and a battery management module. The battery may discharge charged power or charge power through the power conversion device 230 according to an operation mode of the energy storage device 250. The battery management module may manage state information of the battery.

The power management device 240 may monitor an amount of power of the new and renewable energy power plant 100. The power management device 240 may determine the operation mode of the energy storage device 250 based on the result of monitoring the reference capacity of the line 300 connected to the new and renewable energy power plant 100 and the amount of power. The power management device 240 may control a power capacity flowing through the line 300 according to the operation mode of the energy storage device 250.

The power conversion device 230 may receive a command corresponding to the operation mode of the energy storage device 250 from the power management device 240 and control the operation of the energy storage device 250 according to the command.

For example, the power management device 240 may obtain state information, operational information, operating information, and operation availability information of the power conversion device 230 from the power conversion device 230. The state information of the power conversion device 230 may be information such as an operating state, circuit breaker information, network, etc. The operational information of the power conversion device 230 may be information such as voltage, current, power, frequency, inverter, etc. The operating information of the power conversion device 230 may be information such as an operating mode, a charge amount, a discharge amount, an accumulated charge amount, an accumulated discharge amount, etc. The operation availability information of the power conversion device 230 may be information such as abnormal voltage, abnormal current, abnormal frequency, abnormal temperature for protection of the power conversion device 230, etc.

For example, the power management device 240 may obtain information such as a state of battery circuit breaker, temperature, voltage, current, power, charge amount, discharge amount, accumulated charge amount, accumulated discharge amount, etc. and battery operation availability by communicating with the battery management module.

For example, when the amount of power of the new and renewable energy power plant 100 exceeds the reference capacity of the line 300, the power management device 240 may determine the operation mode of the energy storage device 250 as a charging mode. The power management device 240 may deliver, to the power conversion device 230, a first command for controlling such that excess power of the amount of power exceeding the reference capacity of the line 300 is stored in the energy storage device 250. The power conversion device 230 may store excess power in the energy storage device 250 according to the first command. The energy storage device 250 may store DC power converted to DC.

For another example, when the amount of power of the new and renewable energy power plant 100 does not exceed the reference capacity of the line 300, the power management device 240 may determine the operation mode of the energy storage device 250 as a discharging mode. The power management device 240 may deliver, to the power conversion device 230, a second command for discharging the power charged in the energy storage device 250, based on the amount of power of the new and renewable energy power plant 100, so that the power capacity flowing through the line 300 is as large as the reference capacity. The power conversion device 230 may discharge the power charged in the energy storage device 250 according to the second command.

For example, the new and renewable energy power plant 100 may be a plurality of power plants. The power management device 240 may monitor the amount of power produced by the plurality of power plants, and determine whether or not the operation mode for the energy storage device 250 is the charging mode for each of a plurality of power plants. Specifically, the power management device 240 may determine whether or not the operation mode for the energy storage device 250 is the charging mode for each power plant, based on the power capacity generated by the plurality of power plants and the reference capacity of the line 300.

For example, when the power capacity generated by the plurality of power plants exceeds the reference capacity of the line 300 and the power capacity generated by the first new and renewable energy power plant 100 does not exceed the reference capacity of the line 300, the power management device 240 may perform control such that the operation mode of the energy storage device 250 for the first new and renewable energy power plant 100 is deactivated and power generated by the first new and renewable energy power plant 100 is transmitted to the line 300. In addition, the power management device 240 may determine the operation mode of the energy storage device 250 for the second new and renewable energy power plant 100 as the charging mode, and charge the energy storage device 250 with power generated by the second new and renewable energy power plant 100.

For example, when the power capacity generated by the plurality of power plants does not exceed the reference capacity of the line 300, the power management device 240 may perform control such that the operation mode of the energy storage device 250 for the plurality of power plants is deactivated and control power generated by the plurality of power plants is transmitted to the line 300.

For example, when the newly installed new and renewable energy power plant 100 other than the new and renewable energy power plant 100 is connected to the energy storage system 200 and the line 300, the power management device 240 may determine the operation mode of the energy storage device 250 based on a result of monitoring the amount of power of the new and renewable energy power plant 100 and the newly installed new and renewable energy power plant 100 and the reference capacity of the line 300. That is, even if the new and renewable energy power plant 100 is additionally installed, power exceeding the reference capacity of the line 300 is charged in the energy storage device 250, thereby contributing to stabilization of the electrical power system without the expansion of the line 300.

For example, the power management device 240 may obtain history information on the amount of power produced by the new and renewable energy power plant 100. 240 may predict an amount of power demanded by the new and renewable energy power plant 100 to be newly installed based on the history information, the storage capacity of the energy storage device 250, and the reference capacity of the line 300. For example, the power management device 240 may obtain information on the amount of power produced by the new and renewable energy power plant 100 for a preset period of time. The power management device 240 may calculate an average amount of power for a preset period based on information on the amount of power. The power management device 240 may predict the amount of power demand based on the average amount of power of the new and renewable energy plant 100, the storage capacity of the energy storage device 250, and the reference capacity of the line 300.

For example, the power management device 240 may generate, based on the amount of power demand, modeling information including information on a type and operational schedule corresponding to the type of the new and renewable energy power plant 100 to be newly installed.

For example, the energy storage device 250 may include a battery and a battery management module. The battery may store DC power obtained by converting power of the new and renewable energy power plant 100 from AC to DC through the power conversion device 230. For example, when the amount of power of the new and renewable energy power plant 100 exceeds the reference capacity of the line 300, the battery may store power through a DC conversion device. In addition, the battery may discharge charged power through the power conversion device 230 to the electrical power system. For example, when the amount of power of the new and renewable energy power plant 100 does not exceed the reference capacity of the line 300 or when the power system line 300 is repaired from a failure, the battery may discharge the charged power to the electrical power system.

The battery management module may obtain state information such as operating state of battery, remaining capacity of battery, durability of battery, temperature, voltage, current, charge amount, discharge amount, etc. The battery management module may cut off a circuit breaker when an abnormal state is detected in the battery.

The battery management module may provide the state information of the battery to the power management device 240 by communicating with the power management device 240. The power management device 240 may efficiently manage the battery using the state information of the battery provided from the battery management module.

In addition, the energy storage device 250 may include a circuit breaker that cuts off the DC power when an abnormality occurs from the power conversion device 230 and a fuse that protects the battery when an overcurrent occurs.

The power management device 240 may efficiently control charging or discharging of the energy storage system 200 by monitoring the amount of power of the new and renewable energy power plant 100. Accordingly, even if the new and renewable energy power plant 100 is newly established, the line 300 may be operated without the expansion of the line 300 by adjusting the load of the line 300 by the energy storage system 200.

Meanwhile, a SCADA controller 500 may obtain operating power information such as current, voltage, etc. by communicating with the substation 410. In addition, the SCADA controller 500 may obtain and monitor failure information of a transmission-end transformer and failure information of the transmission line 300. The power management device 240 may obtain operational information of the electrical power system, failure information of the transmission-end transformer, and failure information of the transmission line 300 by communicating with the SCADA controller 500.

Figure 3:
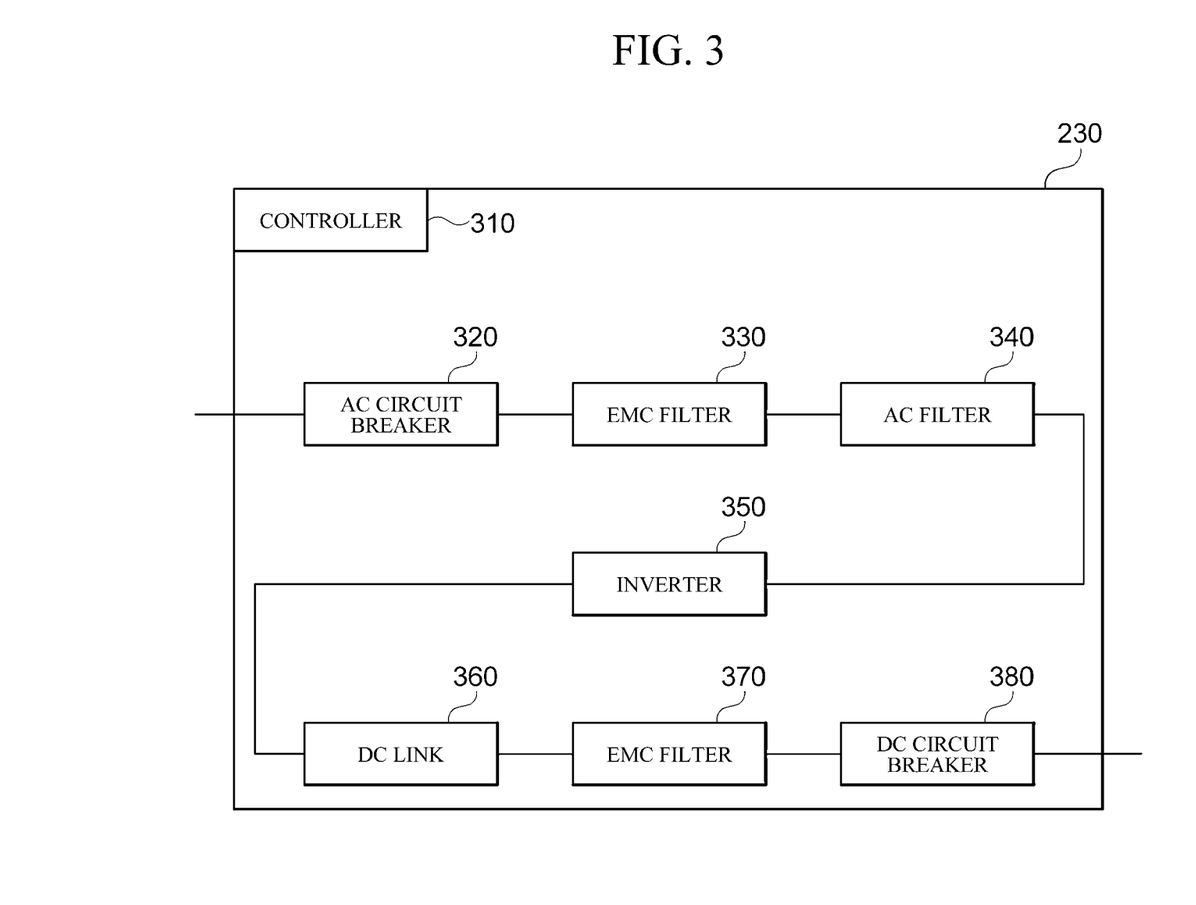
FIG. 3 is a block diagram illustrating a configuration of a power conversion device according to an embodiment.

FIG. 3 is a block diagram illustrating a configuration of the power conversion device 230 according to an embodiment.

Referring to FIG. 3, the power conversion device 230 may include a controller 310, an AC circuit breaker 320, an EMC filter 330, an AC filter 340, an inverter 350, a DC link 360, an EMC filter 370, and a DC circuit breaker 380.

The controller 310 may control the operation of the AC breaker 320, the EMC filter 330, the AC filter 340, the inverter 350, the DC link 360, the EMC filter 370, and the DC breaker 380.

The AC circuit breaker 320 may cut off the electrical power system side when an abnormality occurs in the electrical power system. The EMC filter 330 may reduce noise generated from the inverter. The AC filter 340 may reduce harmonics for sinusoidalization. The inverter 350 may be controlled to convert AC power into DC power. The DC link 360 may smooth the converted pulsating current into DC. The EMC filter 370 may reduce DC-side noise. The DC circuit breaker 380 may cut off a DC power source when an abnormality of the DC power source of the energy storage device 250 occurs.

Not all components illustrated in FIG. 3 are essential components. The power conversion device 230 may be implemented with more components than those illustrated in FIG. 3, and the power conversion device 230 may be implemented with fewer components. The power conversion device 230 illustrated in FIG. 3 may correspond identically to the power conversion device 230 illustrated in FIG. 2. The following operation may be performed by the operation of components of the power conversion device 230.

The power conversion device 230 may receive a command corresponding to the operation mode of the energy storage device 250 from the power management device 240, and control the operation of the energy storage device 250 so as to charge the energy storage device with power of the new and renewable energy power plant 100 or to discharge the power stored in the energy storage device, according to a command.

For example, when the amount of power of the new and renewable energy power plant 100 exceeds the reference capacity of the line 300, the power conversion device 230 may receive a command corresponding to the charging mode by communicating with the power management device 240 and charge the energy storage device 250 with the power of the new and renewable energy power plant 100.

For example, when the amount of power of the new and renewable energy power plant 100 does not exceed the reference capacity of the line 300, the power conversion device 230 may receive a command corresponding to the discharging mode by communicating with the power management device 240, and discharge the power stored in the energy storage device 250 to the electrical power system through the line 300.

For example, the power conversion device 230 may enable the energy storage system 200 to operate efficiently by providing the state information, operational information, operating information, and operation availability information of the power conversion device 230 to the power management device 240.

For example, the power conversion device 230 may monitor whether abnormal voltage, abnormal current, abnormal frequency, abnormal temperature, etc. are detected in the energy storage system 200, and stop the operation of the energy storage system 200 when an abnormal state is detected.

Figure 4:
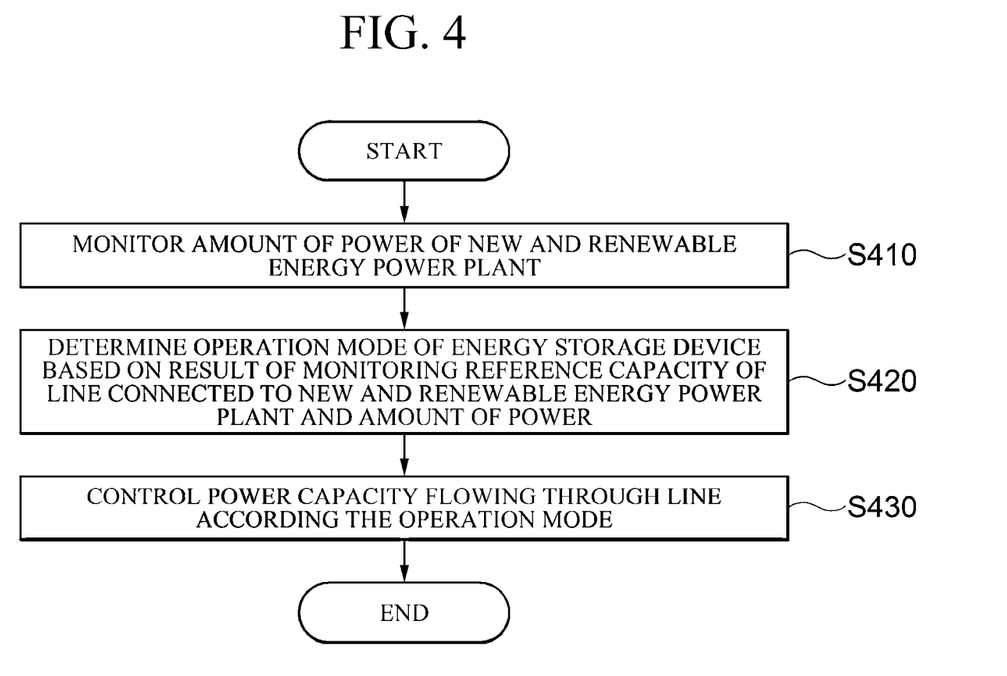
FIG. 4 is a flowchart illustrating a method of operation of an energy storage system according to an embodiment.

FIG. 4 is a flowchart illustrating a method of operation of the energy storage system 200 according to one embodiment.

Referring to FIG. 4, in step S410, the energy storage system 200 may monitor the amount of power of the new and renewable energy power plant 100. For example, the energy storage system 200 may obtain information on the amount of power produced by the new and renewable energy power plant 100 from the new and renewable energy power plant 100.

For example, there may be a plurality of new and renewable energy power plant 100. The energy storage system 200 may monitor the amount of power for each new and renewable energy power plant 100. For example, the new and renewable energy power plant 100 may be a solar power plant, a wind power plant, a tidal power plant, a wave power plant, a fuel cell power plant, a bio power plant, etc.

In step S420, the energy storage system 200 may determine the operation mode of the energy storage device 250 based on the result of monitoring the reference capacity of the line 300 connected to the new and renewable energy power plant 100 and the amount of power. For example, the energy storage device 250 may be a device that stores energy generated by the new and renewable energy power plant 100. The energy storage device 250 may include the battery and the battery management module.

When the amount of power flowing through the line 300 exceeds the reference capacity, the line 300 becomes unstable and may cause a failure of the line 300 or a transformer. Accordingly, the amount of power flowing through the line 300 needs to be adjusted so as not to exceed the reference capacity. The energy storage system 200 may control the power capacity of the line 300 flowing through the energy storage system 200 based on the result of monitoring the amount of power generated by the new and renewable energy power plant 100.

For example, when the amount of power generated by the new and renewable energy power plant 100 is sufficient, the energy storage system 200 may operate in the charging mode for charging an amount of power exceeding the reference capacity of the line 300.

For example, when the amount of power generated by the new and renewable energy power plant 100 is insufficient to supply enough to be the reference capacity to the line 300, the energy storage system 200 may operate in the discharging mode for discharging power charged in the energy storage device 250.

In step S430, the energy storage system 200 may control the power capacity flowing through the line 300 according to the operation mode.

For example, when the operation mode of the energy storage device 250 is the charging mode, the energy storage system 200 may store the amount of power exceeding the reference capacity of the line 300 in the energy storage device 250 and control the power flowing through the line 300 not to exceed the reference capacity.

For another example, when the operation mode of the energy storage device 250 is the discharging mode, the energy storage system 200 may discharge the power stored in the energy storage device 250 and controls power flowing through the line 300 not to exceed the reference capacity.

Figure 5:
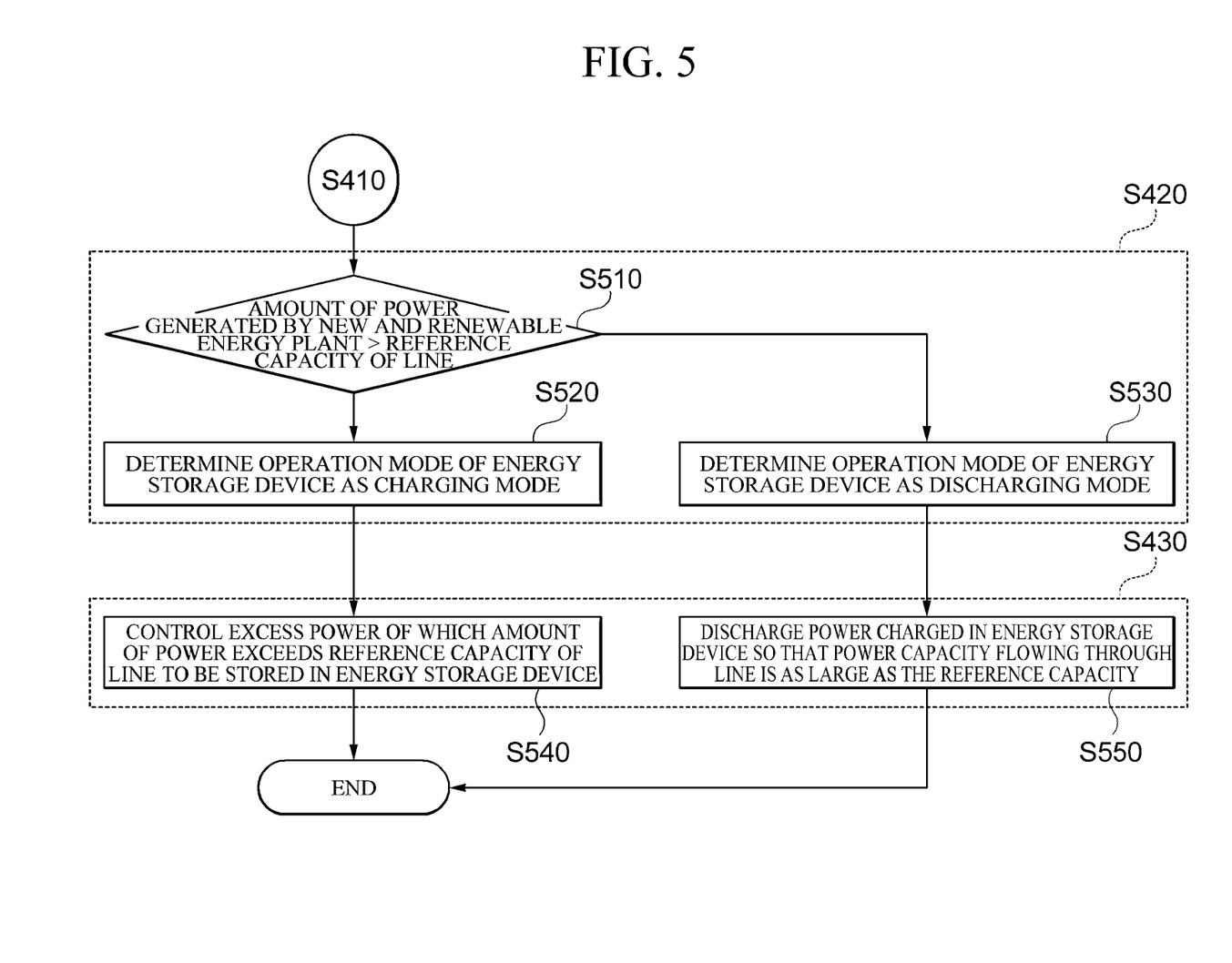
FIG. 5 is a flowchart illustrating the method of operation of the energy storage system that determines an operation mode of the energy storage device and controls a power capacity flowing through a line according to the operation mode, according to an embodiment.

FIG. 5 is a flowchart illustrating an operating method of the energy storage system 200 that determines the operating mode of the energy storage device 250 and controls the power capacity flowing through the line 300 according to the operating mode, according to an embodiment.

FIG. 5 is a diagram for describing steps S420 and S430 described in FIG. 4.

Referring to FIG. 5, in step S510, the energy storage device 250 may monitor the amount of power of the new and renewable energy plant 100 to check whether the amount of power generated by the new and renewable energy plant 100 exceeds the reference capacity of the line 300. When the amount of power generated by the new and renewable energy power plant 100 exceeds the reference capacity of the line 300, according to step S520, the energy storage device 250 may determine the operation mode of the energy storage device 250 as the charging mode.

When the energy storage device 250 operates in the charging mode as the operating mode, in step S540, the energy storage system 200 may control excess power of which amount of power exceeds the reference capacity of the line 300 to be stored in the energy storage device 250. For example, the energy storage system 200 may store DC power, which is obtained by converting the excess power from AC to DC through the power conversion device 230 in the energy storage system 200, in the energy storage device 250.

On the other side, when the amount of power generated by the new and renewable energy power plant 100 does not exceed the reference capacity of the line 300, according to step S530, the energy storage device 250 may determine the operation mode of the energy storage device 250 as the discharging mode.

When the energy storage device 250 operates in the discharging mode as the operating mode, in step S550, the energy storage system 200 may discharge the power charged in the energy storage device 250 so that the power capacity flowing through the line 300 is as large as the reference capacity.

Figure 6:
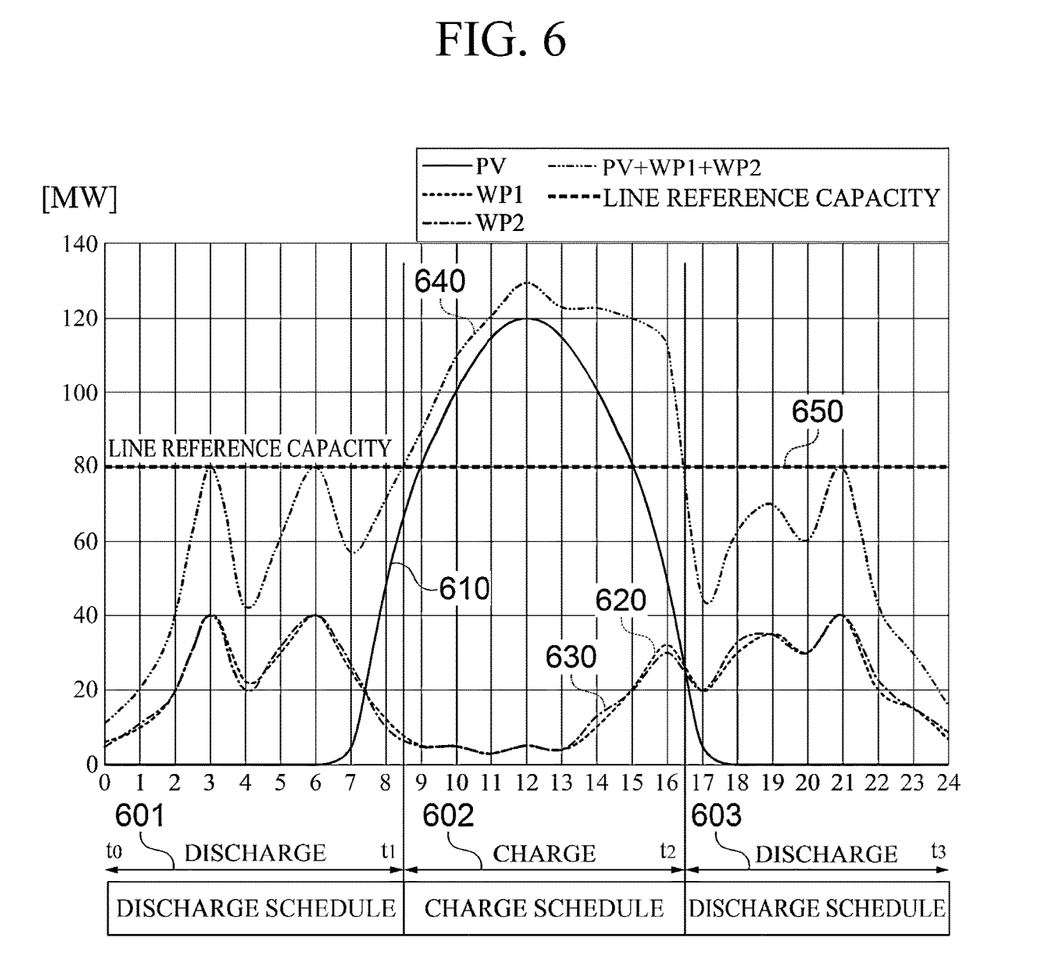
FIG. 6 is a graph for describing an operation of the energy storage system according to the amount of power generated by the new and renewable energy power plant according to one embodiment.

FIG. 6 is a graph for describing the operation of the energy storage system 200 according to the amount of power generated by the new and renewable energy power plant 100 according to an embodiment.

For example, it is assumed that the new and renewable energy power plant 100 includes a solar power plant, a first wind power plant, and a second wind power plant. In addition, it is assumed that the reference capacity of the line 300 is 80 MW. In addition, it is assumed that the first wind power plant and the second wind power plant are existing new and renewable energy power plants 100, and solar power plant is a newly installed new and renewable energy power plant 100. In addition, it is assumed that the maximum capacity summed between the first wind power plant and the second wind power plant is 80 MW, and the maximum capacity of the solar power plant is 20 MW.

Referring to FIG. 6, a first graph 610 represents the amount of power of the solar power plant, a second graph 620 represents the amount of power of the first wind power plant, a third graph 630 represents the amount of power of the second wind power plant, a fourth graph 640 represents the total amount of power of the solar power plant, the first wind power plant, and the second wind power plant, and a fifth graph 650 represents the reference capacitance of the line 300.

Referring to FIG. 6, in a section 601 from to t1, the total amount of power does not exceed the reference capacity of the line 300. In a section 602 from t1 to t2, the total amount of power exceeds the reference capacity of the line 300. In a section 603 from t2 to t3, the total amount of power does not exceed the reference capacity of the line 300.

For example, the energy storage system 200 may determine the operation mode of the energy storage device 250 as the discharging mode for the sections where the total amount of power does not exceed the reference capacity of the line 300, and discharge the power charged in the energy storage device 250. That is, when the amount of power produced by the new and renewable energy power plant 100 is less than the reference capacity of the line 300, since the line 300 has a surplus in capacity, the energy storage system 200 may discharge the charged power to the line 300. In this case, each new and renewable energy power plant 100 may transmit the produced power through the line 300. As illustrated in FIG. 6, the energy storage system 200 may control the operation of the energy storage system 200 according to the discharge schedule in the section 601 from to t1 and the section 603 from t2 to t3.

For example, the energy storage system 200 may determine the operation mode of the energy storage device 250 as the charging mode for the section where the total amount of power exceeds the reference capacity of the line 300, and charge the energy storage device 250 with power. In this case, the energy storage system 200 may charge the energy storage device 250 with excess power exceeding the reference capacity. As illustrated in FIG. 6, the energy storage system 200 may control the operation of the energy storage system 200 according to a charging schedule in the section 602 from t1 to t2.

Figure 7:
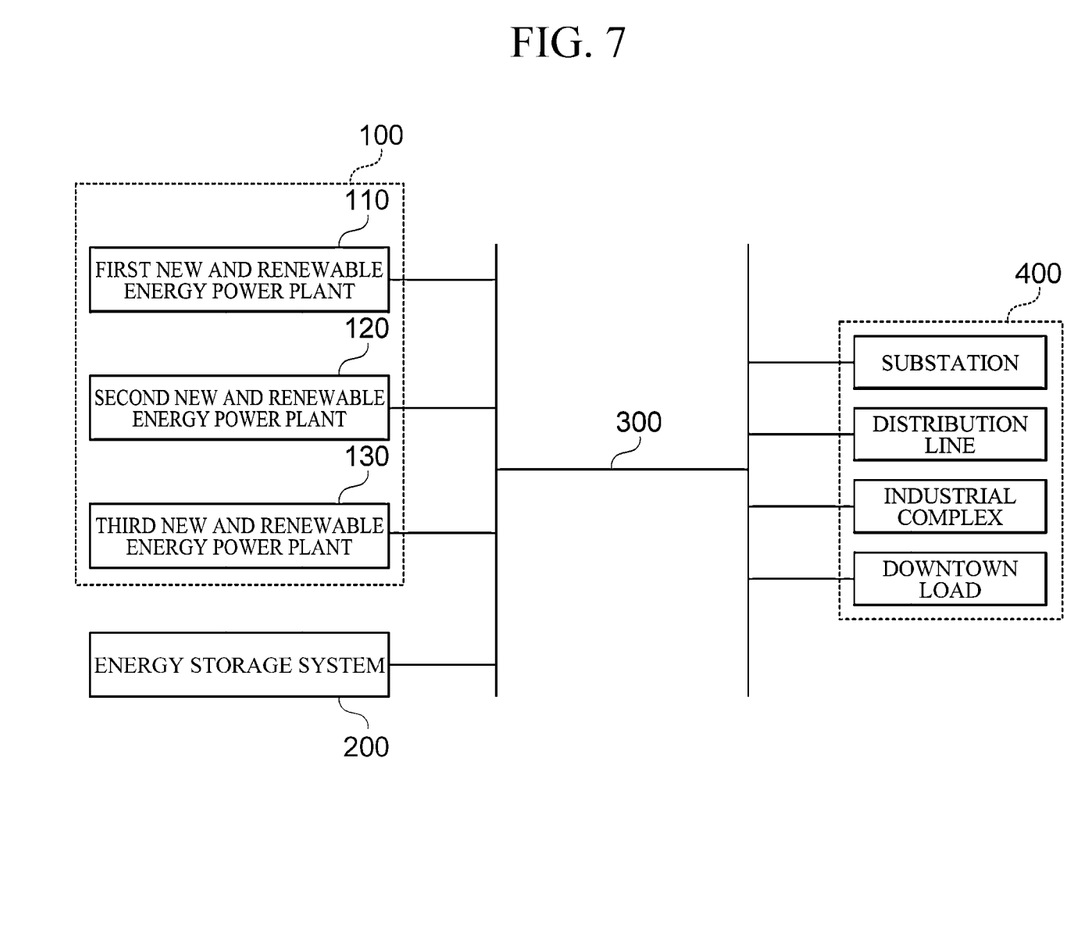
FIG. 7 is a diagram for describing an operation of operating each new and renewable energy power plant by the energy storage system when there are a plurality of new and renewable energy power plants, according to an embodiment.

FIG. 7 is a diagram for describing an operation of operating each new and renewable energy power plant by the energy storage system when there are a plurality of new and renewable energy power plants, according to an embodiment.

Referring to FIG. 7, when the new and renewable energy power plant 100 is a plurality of power plants, the energy storage system 200 may monitor the amount of power produced by the plurality of power plants and determine whether or not the operation mode for the energy storage device 250 is the charging mode for each of the plurality of power plants.

For example, it is assumed that the total amount of power produced by the first new and renewable energy power plant 110, the second new and renewable energy power plant 120, and the third new and renewable energy power plant 130 exceeds the reference capacity of the line 300 and the amount of power produced by the first new and renewable energy power plant 110 and the second new and renewable energy plant 120 does not exceed the reference capacity of the line 300. The energy storage system 200 may deactivate the operation modes of the first new and renewable energy power plant 110 and the second new and renewable energy power plant 120, and determine the operation mode of the energy storage device 250 for the third new and renewable energy power plant 130 as the charging mode. In this case, the power generated by the first new and renewable energy power plant 110 and the second new and renewable energy power plant 120 is transmitted to the load through the line 300, and the power generated by the third new and renewable energy power plant 130 may be charged in the energy storage system 200. As another example, within a range in which the amount of power flowing through the line 300 does not exceed the reference capacity, only a part of the power generated by the third new and renewable energy power plant 130 may be charged in the energy storage system 200.

By determining whether or not the operation mode for the energy storage device 250 is the charging mode for each new and renewable energy power plant, the load of the line 300 may be adjusted so that the amount of power flowing through the line 300 does not exceed the reference capacity, and the utilization rate of the line 300 may be increased.

Figure 8:
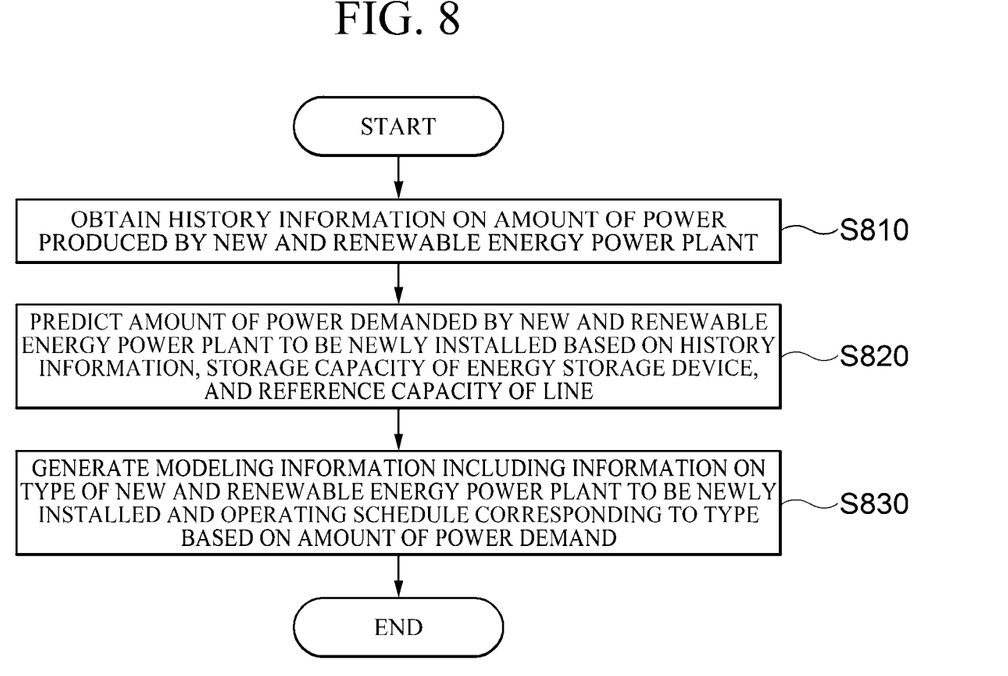
FIG. 8 is a flowchart illustrating a method of operation of an energy storage system that predicts the amount of power demanded by a new and renewable energy power plant to be newly installed and generates modeling information of the new and renewable energy power plant, according to an embodiment.

FIG. 8 is a flowchart illustrating an operating method of an energy storage system that predicts the amount of power demanded by a new and renewable energy power plant to be newly installed and generates modeling information of the new and renewable energy power plant, according to an embodiment.

Referring to FIG. 8, in step S810, the energy storage system 200 may obtain history information on the amount of power produced by the new and renewable energy power plant. For example, the history information may be information about the amount of power produced by the new and renewable energy power plant for a preset period of time.

In step S820, the energy storage system 200 may predict the amount of power demanded by the new and renewable energy power plant to be newly installed based on the history information, the storage capacity of the energy storage device, and the reference capacity of the line 300.

For example, as for the history information, the amount of power produced by the renewable energy power plant 100 may be 50 MW. The storage capacity of the energy storage device may be 300 MW, and the reference capacity of the line 300 may be 120 MW. In this case, a range of the amount of power demand may be from a first amount of power demand corresponding to a first condition for allowing power to flow through the line 300 as much as the reference capacity to a second amount of power demand corresponding to a second condition for allowing the energy storage device to be fully charged with power. Here, the first amount of power demand may be 70 MW, and the second amount of power demand may be 370 MW.

In step S830, the energy storage system 200 may generate modeling information including information on a type of the new and renewable energy power plant to be newly installed and an operational schedule corresponding to the type based on the amount of power demand.

For example, for each type of new and renewable energy power plant, the amount of power that can be produced maybe set in advance according to a size and location of the power plant. The energy storage system 200 may generate modeling information including information on a type of new and renewable energy power plant and an operational schedule for producing the amount of power demanded by the new and renewable energy power plant based on the amount of power demand. In addition, the modeling information may include information on the size and location of the new and renewable energy power plant.

Figure 9:
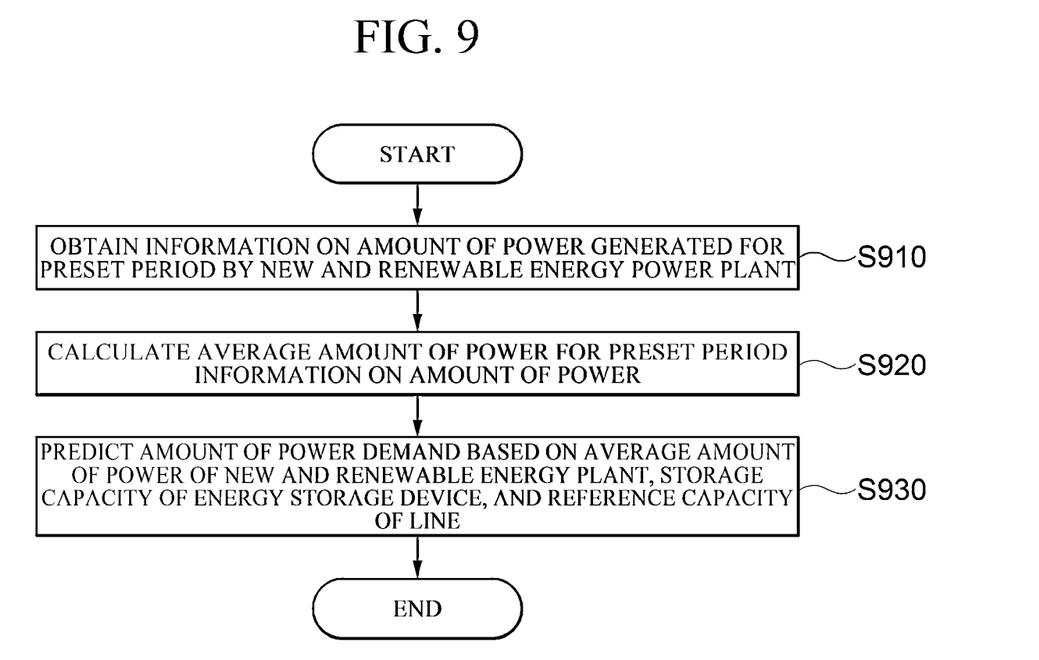
FIG. 9 is a flowchart illustrating a method of operation of an energy storage system that predicts the amount of power demanded by the new and renewable energy power plant to be newly installed according to an embodiment.

FIG. 9 is a flowchart illustrating an operating method of the energy storage system 200 that predicts the amount of power demanded by the new and renewable energy power plant to be newly installed according to an embodiment.

Referring to FIG. 9, in step S910, the energy storage system 200 may obtain information on the amount of power generated for a preset period in the new and renewable energy power plant.

In step S920, the energy storage system 200 may calculate an average amount of power for the preset period based on information on the amount of power.

In step S930, the energy storage system 200 may predict the amount of power demand based on the average amount of power of the new and renewable energy plant, the storage capacity of the energy storage device, and the reference capacity of the line 300. In addition, the energy storage system 200 may change the amount of power demand to an average amount of power and predict the average amount of power.

Figure 10:
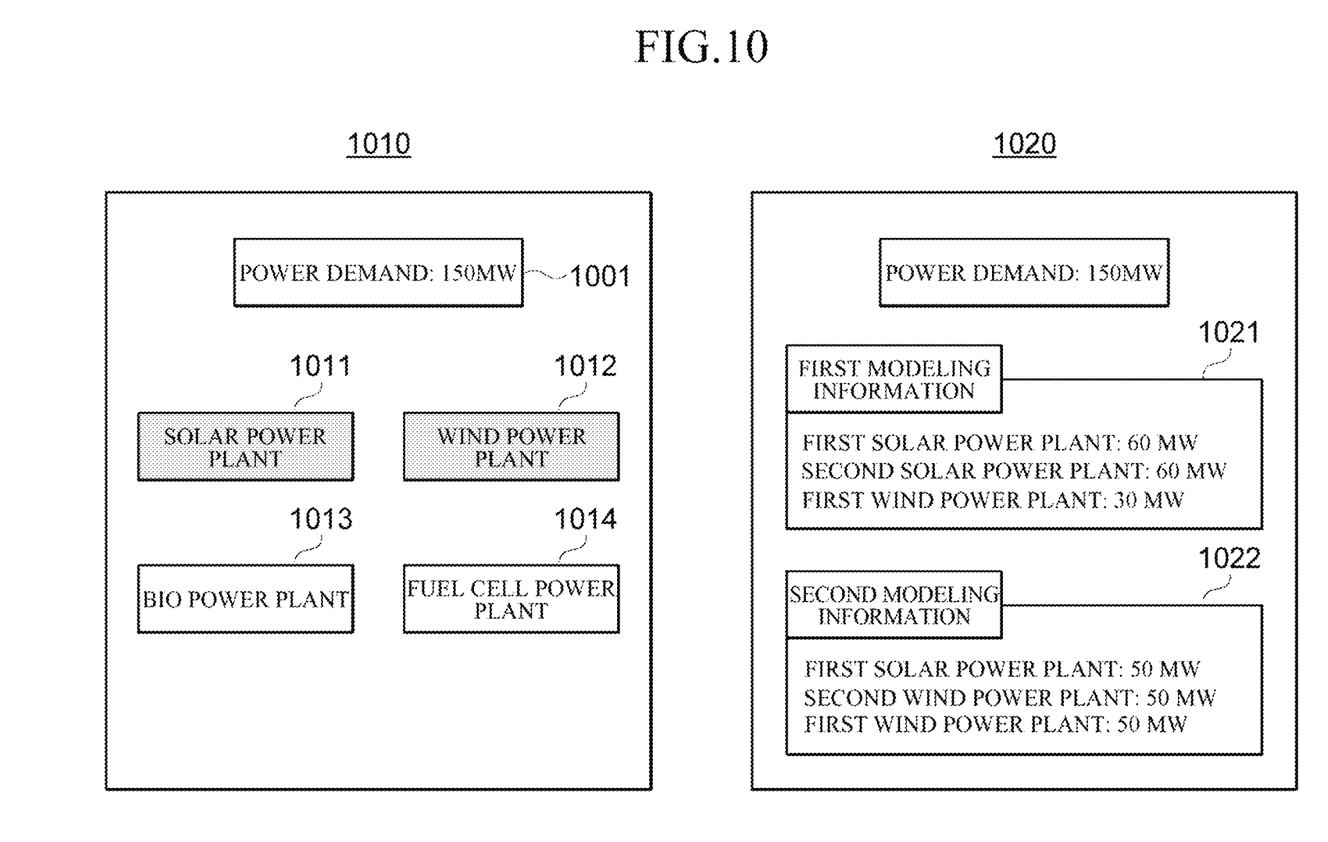
FIG. 10 is a diagram for describing a process of generating modeling information of the new and renewable energy power plant to be newly installed according to an embodiment.

FIG. 10 is a diagram for describing a process of generating modeling information of the new and renewable energy power plant to be newly installed according to an embodiment.

Referring to an image 1010 of FIG. 10, the management device may display information used to model a new and renewable energy power plant to be newly installed. For example, the management device may display information about the amount of power demand and type information of the new and renewable energy power plant. The management device may receive input information for selecting type information of the new and renewable energy power plant.

For example, the management device may display a solar power plant 1011, a wind power plant 1012, a bio power plant 1013, and a fuel cell power plant 1014 as the type information of the new and renewable energy power plant. The management device may receive input information for selecting the solar power plant 1011 and the wind power plant 1012.

For example, the management device may transmit the input information to the energy storage system 200. The energy storage system 200 may generate modeling information about the new and renewable energy power plant based on the input information. For another example, the management device may generate modeling information of the new and renewable energy power plant based on the input information.

Referring to an image 1020 of FIG. 10, the management device may display modeling information of the new and renewable energy power plant to be newly installed. For example, the management device may generate at least one piece of modeling information 1021 and 1022 by combining the solar power plant and the wind power plant. The management device may display at least one piece of modeling information 1021 and 1022. The modeling information 1021 and 1022 may include information on the type of new and renewable energy power plant to be newly installed and the amount of power that can be produced for each power plant.

As illustrated in the image 1020 of FIG. 10, when there is a plurality of modeling information, the management device may display the modeling information according to a preset priority. For example, the preset priority may be set based on at least one of the order of interest of the power plant, required expansion cost, expansion location, and expansion scale.

The energy storage system 200 and power system described in this disclosure may be implemented as hardware components, software components, and/or a combination of hardware components and software components. In addition, the present disclosure may be provided in the form of a computer program stored in a computer-readable storage medium so as to perform the method of operation of the energy storage system 200 and the power system. In addition, the present disclosure can be written as a program that can be executed on a computer, and can be implemented in a general-purpose digital computer that operates such a program using the computer-readable storage medium.

Such computer-readable storage media may include a read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and may be any device capable of storing instructions or software, related data, data files, and data structures and capable of providing instructions or software, related data, data files, and data structures to a processor or computer so that the processor or computer executes the instructions.

Even if new and renewable energy power plants are expanded, it is possible to contribute to the stabilization of the electrical power system through the energy storage system without the expansion of a line.

Even if the new and renewable energy power plants are expanded, the line can be operated without the expansion of a line by adjusting the load of the line using the energy storage system, and the investment cost of the expansion of a line can be reduced.

By controlling a charging operation or a discharging operation of the energy storage system, a utilization rate of the line can be improved.

By expanding the new and renewable energy power plants from existing facilities, the goal of reducing carbon dioxide can be achieved.

Although the embodiments have been described in detail above, the scope of the present invention is not limited thereto, and various modifications and improvements made by those skilled in the art using the basic concept of the present invention defined in the following claims also fall within the scope of the present invention.

What is claimed is:
1. An energy storage system comprising:
an energy storage device configured to store energy generated from a new and renewable energy power plant;
a power management device configured to monitor an amount of power of the new and renewable energy power plant, determine an operation mode of the energy storage device based on a result of monitoring a reference capacity of a line connected to the new and renewable energy plant and the amount of power, and control a power capacity flowing through the line according to the operation mode; and
a power conversion device configured to receive a command corresponding to the operation mode from the power management device and control an operation of the energy storage device according to the command, wherein the power management device is further configured to
  obtain history information on the amount of power produced by the new and renewable energy power plant,
  predict an amount of power corresponding to a condition, which is based on a storage capacity of the energy storage device and the reference capacity of the line, of a new and renewable energy power plant to be newly installed using the condition and the history information, and
  generate modeling information including information about a type of the new renewable energy power plant to be newly installed and an operational schedule corresponding to the type, based on the predicted amount of power.

2. The energy storage system of claim 1, wherein the power management device is further configured to:
  determine the operation mode of the energy storage device as a charging mode when the amount of power of the new and renewable energy plant exceeds the reference capacity of the line; and
  determine the operation mode of the energy storage device as a discharging mode when the amount of power of the new and renewable energy power plant does not exceed the reference capacity of the line.

3. The energy storage system of claim 1, wherein, when the new and renewable energy power plant is a plurality of power plants, the power management device is configured to monitor the amount of power produced by the plurality of power plants and determine whether or not the operation mode of the energy storage device is a charging mode for each of the plurality of power plants.

4. The energy storage system of claim 1, wherein, when the operation mode is determined as a charging mode, the power management device is configured to deliver a first command, which is for controlling excess power of the amount of power exceeding the reference capacity of the line to be stored in the energy storage device, to the power conversion device.

5. The energy storage system of claim 1, wherein, when the operation mode is determined as a discharging mode, the power management device is configured to deliver a second command, which is for discharging power charged in the energy storage device based on the amount of power of the new and renewable energy power plant so that the power capacity flowing through the line is as large as the reference capacity, to the power conversion device.

6. The energy storage system of claim 1, wherein, when a newly installed new and renewable energy power plant other than the new and renewable energy power plant is connected to the energy storage system and the line, the power management device is configured to determine the operation mode of the energy storage device based on a result of monitoring the amount of power of the new and renewable energy power plant and the newly installed new and renewable energy power plant and the reference capacity of the line.

7. The energy storage system of claim 1, wherein the modeling information is transmitted to an operator's management device.

8. The energy storage system of claim 1, wherein the power management device is further configured to:
  obtain information on the amount of power produced for a preset period by the new and renewable energy power plant;
  calculate an average amount of power for the preset period based on information on the amount of power; and
  predict the amount of power corresponding to the condition of the renewable energy power plant to be newly installed, based on the average amount of power of the new and renewable energy plant, the storage capacity of the energy storage device, and the reference capacity of the line.

9. The energy storage system of claim 1, wherein the energy storage device includes:
  a battery configured to discharge charged power or charge power, through the power conversion device according to the operation mode; and
  a battery management module configured to manage state information of the battery.

10. A method of operation of an energy storage system, the method comprising:
  monitoring an amount of power of a new and renewable energy power plant;
  determining an operation mode of an energy storage device based on a result of monitoring a reference capacity of a line connected to the new and renewable energy plant and the amount of power;
  controlling a power capacity flowing through the line according to the operation mode;
  obtaining history information on the amount of power produced by the new and renewable energy power plant;
  predicting an amount of power corresponding to a condition, which is based on a storage capacity of the energy storage device and the reference capacity of the line, of a new and renewable energy power plant to be newly installed using the condition and the history information; and
  generating modeling information including information about a type of the new renewable energy power plant to be newly installed and an operational schedule corresponding to the type, based on the predicted amount of power.

11. The method of claim 10, wherein the determining of the operation mode of the energy storage device includes:
  determining the operation mode of the energy storage device as a charging mode when the amount of power of the new and renewable energy plant exceeds the reference capacity of the line; and
  determining the operation mode of the energy storage device as a discharging mode when the amount of power of the new and renewable energy plant does not exceed the reference capacity of the line.

12. The method of claim 10, wherein the controlling of the power capacity flowing through the line according to the operation mode includes:
  delivering a first command, which is for controlling excess power of the amount of power exceeding the reference capacity of the line to be stored in the energy storage device, to the power conversion device when the operation mode is determined as a charging mode; and
  transmitting a second command, which is for discharging power charged in the energy storage device based on the amount of power of the new and renewable energy power plant so that the power capacity flowing through the line is as large as the reference capacity, to the power conversion device when the operation mode is determined to be a discharging mode.

13. A power system comprising:
a new and renewable energy power plant;
a line connected to the new and renewable energy power plant and configured to supply generated power to an electrical power system; and
an energy storage system that is connected to the line and is configured to monitor an amount of power of the new and renewable energy power plant, determine an operation mode of an energy storage device based on a result of monitoring a reference capacity of the line and the amount of power, and control a power capacity flowing through the line according to the operation mode,
wherein the energy storage system is configured to:
  obtain history information on the amount of power produced by the new and renewable energy power plant;
  predict an amount of power corresponding to a condition, which is based on a storage capacity of the energy storage device and the reference capacity of the line, of a new and renewable energy power plant to be newly installed using the condition and the history information; and
  generate modeling information including information about a type of the new renewable energy power plant to be newly installed and an operational schedule corresponding to the type, based on the predicted amount of power.

\* \* \* \* \*